(12) United States Patent
Beutel et al.

(10) Patent No.: US 7,055,311 B2
(45) Date of Patent: Jun. 6, 2006

(54) EMISSION CONTROL SYSTEM FOR VEHICLES POWERED BY DIESEL ENGINES

(75) Inventors: Tilman Wolfram Beutel, Neshanic Station, NJ (US); John Lawrence Calabrese, Summit, NJ (US)

(73) Assignee: Engelhard Corporation, Iselin, NJ (US)

( * ) Notice: Subject to any disclaimer, the term of this patent is extended or adjusted under 35 U.S.C. 154(b) by 0 days.

(21) Appl. No.: 10/232,648

(22) Filed: Aug. 31, 2002

(65) Prior Publication Data

US 2004/0040287 A1    Mar. 4, 2004

(51) Int. Cl.
*F01N 3/00* (2006.01)
(52) U.S. Cl. .................. 60/285; 60/274; 60/276; 60/287; 60/295; 60/301; 60/311
(58) Field of Classification Search ............. 60/276, 60/285, 295, 297, 301, 311, 274, 287, 288
See application file for complete search history.

(56) References Cited

U.S. PATENT DOCUMENTS

| | | | |
|---|---|---|---|
| 4,303,053 A | 12/1981 | Etoh et al. | |
| 4,510,909 A * | 4/1985 | Elphick et al. | 123/470 |
| 5,100,632 A | 3/1992 | Dettling et al. | |
| 5,191,867 A | 3/1993 | Glassey | |
| 5,261,366 A | 11/1993 | Regueiro | |
| 5,657,625 A | 8/1997 | Koga et al. | |
| 5,727,385 A | 3/1998 | Hepburn | |
| 5,750,082 A | 5/1998 | Hepburn et al. | |
| 5,753,192 A | 5/1998 | Dobson et al. | |
| 5,758,489 A | 6/1998 | Hepburn et al. | |
| 5,795,553 A | 8/1998 | Lott et al. | |
| 5,804,155 A | 9/1998 | Farrauto et al. | |
| 5,874,057 A | 2/1999 | Deeba et al. | |
| 5,910,097 A | 6/1999 | Boegner et al. | |
| 5,974,791 A * | 11/1999 | Hirota et al. | 60/276 |
| 6,014,859 A | 1/2000 | Yoshizaki | |
| 6,021,638 A * | 2/2000 | Hochmuth | 60/274 |
| 6,023,929 A | 2/2000 | Ma | |
| 6,026,790 A | 2/2000 | Itoyama | |

(Continued)

FOREIGN PATENT DOCUMENTS

DE    196 26 835 A1    1/1997

(Continued)

OTHER PUBLICATIONS

Yuejin Li, Stan Roth, Mahmoud Yassine, Tilman Beutel, and Joe Dettling; Study of Factors Influencing the Performance of a NOx Trap in a Light-Duty Diesel Vehicle; SAE Paper; Jan. 2000.

*Primary Examiner*—Thomas Denion
*Assistant Examiner*—Diem Tran
(74) *Attorney, Agent, or Firm*—Richard A. Negin

(57) ABSTRACT

An NOx emission system for diesel powered vehicles has a "Y" exhaust system with an NOx adsorber catalyst in each leg and an oxidation catalyst in the combined leg. One bank of cylinders sends exhaust gases to one of the "Y" legs while a second bank of cylinders send exhaust gases to the other "Y" leg. Composition of the exhaust gases in each leg is independently controlled by the engine's ECU so that exhaust gases in one leg are rich for regenerating the NOx adsorber catalyst in that leg while exhaust gas composition in the other leg is lean so that the combined gas stream is always lean and reductant slip is oxidized in the oxidation catalyst.

32 Claims, 4 Drawing Sheets

U.S. PATENT DOCUMENTS

| | | | |
|---|---|---|---|
| 6,047,542 A * | 4/2000 | Kinugasa et al. | 60/274 |
| 6,082,100 A * | 7/2000 | Boegner et al. | 60/278 |
| 6,082,325 A | 7/2000 | Digeser et al. | |
| 6,125,629 A | 10/2000 | Patchett | |
| 6,134,882 A * | 10/2000 | Huynh et al. | 60/274 |
| 6,150,291 A | 11/2000 | Deeba et al. | |
| 6,209,516 B1 | 4/2001 | Yamashita | |
| 6,250,074 B1 * | 6/2001 | Suzuki et al. | 60/285 |
| 6,274,107 B1 | 8/2001 | Yavuz et al. | |
| 6,324,835 B1 * | 12/2001 | Surnilla et al. | 60/274 |
| 6,347,514 B1 | 2/2002 | Takahashi et al. | |
| 6,354,077 B1 | 3/2002 | Behr et al. | |
| 6,354,269 B1 | 3/2002 | Saito et al. | |
| 6,374,597 B1 | 4/2002 | Bidner et al. | |
| 6,375,910 B1 | 4/2002 | Deeba et al. | |
| 6,381,954 B1 | 5/2002 | Kakuyama et al. | 60/285 |
| 6,499,294 B1 * | 12/2002 | Katoh et al. | 60/301 |
| 6,550,240 B1 * | 4/2003 | Kolmanovsky et al. | 60/285 |

FOREIGN PATENT DOCUMENTS

| | | |
|---|---|---|
| DE | 196 26 836 A1 | 1/1997 |
| DE | 196 26 837 A1 | 1/1997 |
| EP | 1 170 472 A1 | 1/2002 |
| JP | 2000-213340 * | 8/2000 |
| JP | 2001-280884 | 10/2001 |
| JP | 2002-227637 | 8/2002 |
| WO | WO 02/14657 A1 | 2/2002 |

* cited by examiner

EMISSION CONTROL SYSTEM FOR VEHICLES POWERED BY DIESEL ENGINES

This invention relates generally to an emission control system for a diesel engine and more particularly to an engine, equipped with an emission system for purifying the engine exhaust gases, that is operated to insure optimal functioning of the emission system.

The invention is particularly applicable to and will be described with specific reference to diesel engines which typically operate at high A/F (air to fuel) ratios. However, those skilled in the art will recognize that the invention may have broader application and conceptually may have application to other internal combustion engines, such as lean burn gasoline fueled engines.

BACKGROUND

It is well known that compression ignition diesel engines have desirable advantages as power sources for vehicles because of their inherent high thermal efficiency (i.e., good fuel economy) and high torque at low speed. Diesel engines operate at high A/F ratios under very lean fuel conditions. As a result, diesel engines have very low emissions of gas phase hydrocarbons (HC) and carbon monoxide. However, the emissions in the diesel exhaust are characterized by relatively high emissions of nitrogen oxides (NOx) and particulates. The particulate emissions (which are measured as condensed material at 52° C.) are multi-phase being comprised of solid (insoluble) carbon soot particles and liquid hydrocarbons in the form of lube oil and unburned fuel which are often referred to as the soluble organic fraction (SOF). In addition because of the presence of sulfur in the fuel there is also present the so-called "sulfate" in the form of $SO_3+H_2O$ $H_2SO_4$. Additionally there is a potential for the emission gases to produce the toxic sulfuric acid, $H_2S$, in the event of "slip".

There are any number of emission purification systems that have and are being developed to purify NOx emissions produced by diesel engines. One well known emission system is to inject an external reductant, typically $NH_3$ or an ammonia precursor or diesel fuel, into the exhaust stream rendering the exhaust stream rich which is then passed over an SCR (selective catalyst reduction) catalyst to reduce the NOx. See for example assignee's U.S. Pat. No. 6,126,629 to Patchett, issued Oct. 3, 2000, and PCT publication WO 02/14657A1, published Feb. 21, 2002. As noted in the PCT publication, when fuel is used as the reductant, especially developed, lean NOx catalysts (either high or low temperature) type are utilized in the emission system.

Emission systems have also been developed for purifying the toxic NOx gases produced by diesel engines that utilize NOx adsorber catalyst systems and it is this type of system to which this invention relates. Conceptually, the working principle of an NOx adsorber catalyst is to store NOx under lean operating conditions. Thereafter, periodical short excursions from lean exhaust gas conditions (lambda>1) to rich (lambda<1) are necessary in order to reduce the stored NOx to harmless nitrogen ($N_2$). During the short rich operation, the exhaust gas in enriched with hydrocarbons (HC) and carbon monoxide (CO) while the oxygen concentration in the exhaust gas is drastically depleted resulting in an exhaust gas being chemically reducing in nature (lambda<1). See, for example, Daimler-Chrysler U.S. Pat. No. 6,082,325, issued Jul. 4, 2000, showing an ECU control scheme for adjusting the engine emissions to provide the rich excursions for a diesel engine and Mazda U.S. Pat. No. 6,354,269, issued Mar. 12, 2002, showing throttling a diesel engine turbocharger for intake air in combination with EGR (exhaust gas recirculation) to provide refreshing of the NOx adsorber catalyst.

It is known that high reductant concentrations are required in order to effectively reduce the stored NOx over the NOx adsorber catalyst. The amount of HC and CO generated by the engine during a rich pulse typically exceeds the stoichiometric quantity of NOx that is to be reduced over the catalyst. This excess of reductant, while necessary for high NOx reduction efficiencies, leads to HC and CO breakthroughs at the NOx adsorber catalyst outlet ("slip"). Under overall reducing exhaust gas conditions, the HC/CO slip cannot be oxidized to harmless $CO_2$ and $H_2O$. The problem of reductant slip is even more severe when the NOx adsorber catalyst is regenerated from adsorbed sulfur oxides (SOx). During the so-called desulfation process the NOx adsorber catalyst is subject to exhaust gas of lambda<1 at temperatures in excess of 550° C. Under these conditions, the catalyst releases previously stored SOx which will then be reduced to $H_2S$ over the NOx adsorber catalyst. $H_2S$ is a toxic and malodorous compound and its emission must be avoided.

Conceptually, there are at least two ways to address the problem. One way to tackle this problem is the use of so-called oxygen storage components (OSC). OSC materials are used in three way catalysts which are well known in emission systems for gasoline powered engines. Three way catalysts adjust the tailpipe lambda to 1 by storing oxygen under lean conditions and reacting the stored oxygen with reductants, HC and CO, when the engine is subsequently operated at rich conditions. OSC materials can oxidize HC/CO during the rich NOx regeneration of an NOx adsorber catalyst provided that the amount of surplus reductant does not exceed the stoichiometric amount of oxygen storage capacity that is available in the OSC material. To prevent any HC/CO slippage, the amount of reductant supplied during the rich pulse still needs to be lower than the stoichiometric amount of stored NOx and all OSC materials combined. Together with the prerequisite for effective NOx reduction, i.e. lambda<1 over the NOx adsorber catalyst, dosage of the right amount of reductants during the rich NOx adsorber regeneration poses a potential control issue. For an example of control of a lean burn, spark ignition type engine see Ford U.S. Pat. No. 6,374,597 to Bidner et al., issued Apr. 23, 2002. It must be recognized, however, that the 3-way catalyst, (at today's technology level), is not operational for diesel engines.

Another way to address the problem is schematically depicted in prior art FIG. 1. This prior art figure is discussed in SAE paper 2000-01-2911 entitled "Study of Factors Influencing the Performance of a NOx Trap in a Light-Duty Diesel Vehicle," by Yuejin Li, Stan Roth, Mahmoud Yassine, Tilman Beutel and Joe Dettling of Engelhard Corp. and Chris Sammer of Johannes Kepler Universitaet. FIG. 1 depicts an external regenerating emission system which bears some resemblance to the present invention. In the prior art FIG. 1 system, the exhaust gas is split into two exhaust legs 1A, 1B, each one containing an NOx adsorber catalyst 2A, 2B. An exhaust flap 3 is mounted at the point where the exhaust is bifurcated into legs 1A, 1B and controls the flow of exhaust gas in each leg 1A, 1B. One of the NOx adsorber catalysts, either 2A or 2B, is regenerated by exhaust flap 3 reducing the flow of exhaust gas (and the oxygen contained therein) to the regenerated catalysts and simultaneously introducing external fuel at 5A or 5B to the reduced flow exhaust stream in front of the regenerated catalyst. Exhaust legs 1A and 1B are then recombined into a common leg 6 which contains an oxidation catalyst 7. After the exhaust streams are recombined in common leg 6, HC/CO break through or slip can be oxidized over oxidation catalyst 7. This is a workable system. Its drawbacks include the fact that a movable valve or flap 3 is required to change the flow rate thus raising durability concerns in a vehicular environment and external fuel must be supplied to the system resulting in a fuel milage penalty and an expense for the injectors. The SAE paper additionally notes that this system may not be effective for light duty diesel engines (passenger cars) because the space allowance for the catalyst converter is limited and the exhaust temperatures for light duty diesel engines are significantly lower than that for heavy duty diesels. Temperatures can be less than 200° C. for light duty diesel engines and at this temperature injected diesel fuel can condense in the exhaust pipe and on the catalyst. A number of Y exhaust leg configurations, similar to that illustrated in FIG. 1, are disclosed in Volkswagen German publications DE 196 26 835 A1, 196 26 836 A1 and 196 26 837 A1, all filed on the same date and published on or about Sep. 1, 1997. All variations appear to inject an external reductant for alternately regenerating the NOx catalysts in the Y which are upstream of an oxidation catalyst. All configurations having valving for selectively directing the diesel exhaust through one or both of the Y branch legs.

As noted above, the prior art has any number of NOx emission control systems. Insofar as the present invention is concerned, Ford U.S. Pat. No. 6,023,929 to Ma issued Feb. 15, 2000 discloses a system for use with spark ignition engines in which one bank of cylinders are periodically activated and deactivated while another bank or group of cylinders are maintained in their active fuel fed state. The emission system comprises a catalytic converter, an ignition chamber downstream of the catalytic converter and a NOx trap or adsorber catalyst downstream of the ignition chamber. When both cylinder groups or banks fire, stoichiometric or reducing exhaust gas is generated for regeneration of the NOx trap. When only one group of cylinders are activated, the exhaust gas is lean and the NOx trap captures NOx. The exhaust gas is lean because the fuel, but not the air, is stopped from being supplied to the deactivated bank or group of cylinders. The system has applicability to spark ignition engines where, in response to a part load demand on the engine, one bank of cylinders can operate efficiently at full load, with less fuel utilization, than if both cylinder banks were throttled at less than full load to meet the partial engine load demand. See also Nissan U.S. Pat. No. 4,303,053 to Etoh et al., issued Dec. 1, 1981, which discloses a similar split mode operating concept with valved EGR.

With respect to a Y exhaust leg configuration, reference can be had to Ford U.S. Pat. No. 6,354,077 to Behr et al., issued Mar. 12, 2002, and Nissan U.S. Pat. No. 6,347,514 to Takahashi et al., issued Feb. 19, 2002, which show independent control of the A/F ratios for separate banks of cylinders in spark ignition engines depending, for example, on the EGO (oxygen sensor) signals.

SUMMARY OF THE INVENTION

Accordingly it is an object of the present invention to provide an improved emission control system for a diesel engine that uses NOx adsorber or trap catalysts for controlling NOx emissions.

This object along with other features of the invention is provided in a system for treating exhaust gases emitted from a vehicle which includes a) a multi-cylinder diesel engine having a first exhaust manifold in fluid communication with a first plurality of cylinders and a second exhaust manifold in fluid communication with a different second plurality of cylinders;

b) a first NOx adsorber catalyst in a first exhaust leg in fluid communication with the first manifold;

c) a second NOx adsorber catalyst in a second exhaust leg in fluid communication with the second manifold;

d) a common exhaust leg having an inlet in fluid communication with the first and second exhaust legs downstream of the first and second NOx catalysts, the common exhaust leg having an oxidation catalyst therein through which exhaust gases from the first and second legs pass after being combined in the common exhaust leg; and e) an ECU controlling the composition of exhaust gases in the first exhaust manifold independently of the composition of exhaust gases in the second exhaust manifold so that when a regeneration of one of the NOx adsorber catalysts is required, the ECU causes the engine to produce rich exhaust gases in one exhaust manifold and lean exhaust gases in the other exhaust gas manifold with the rich gases having sufficient quantities of combustible gases to cause the NOx adsorber catalyst in contact therewith to release oxides of nitrogen stored therein while the other NOx adsorber catalyst adsorbs NOx present in the lean gases in the other exhaust manifold.

In accordance with another important feature of the invention, the ECU controls the composition of gases present in the rich exhaust gas leg and the composition of gases present in the lean exhaust gas leg to produce a combined gas stream in the common exhaust leg upstream of the oxidation catalyst having a lambda not less than 1.00 whereby HC, CO and $H_2S$ slip is minimized. ("Lambda" means an A/F ratio divided by that A/F ratio necessary to support stoichiometric combustion. A lambda of 1 means an A/F ratio which produces stoichiometric combustion.)

In accordance with another aspect of the invention, the regeneration of each NOx absorber catalyst can sequentially occur by the ECU simply switching the exhaust gas compositions from one cylinder bank to the other cylinder bank. It is therefore possible to trigger the rich/lean alternating routine at relatively low saturation levels of the NOx adsorber catalyst somewhat limiting the burst of NOx emissions which otherwise occurs when a fully saturated NOx absorber catalyst is first subjected to regeneration.

In accordance with another feature of the invention, the invention is not limited to any specific composition and make-up of the NOx adsorber catalyst and lean NOx catalysts can be regenerated as well as NOx adsorber catalysts. Additionally, other catalysts, such as catalyzed soot filters, may be placed in the exhaust leg upstream or downstream of each NOx catalyst or combined with the NOx casing or integrated into an NOx adsorber catalyst.

For the active regeneration of the catalyzed soot filter (CSF) from accumulated soot, the exhaust temperature in the exhaust leg containing the CSF is raised while the overall gas composition stays lean. In this operation mode, oxygen in the exhaust gas reacts with carbon on the CSF to form CO and $CO_2$. CO is then subsequently combusted to $CO_2$ over the CSF. During the soot regeneration of the CSF, the bed temperature of the NOx adsorber catalyst located in the same exhaust leg may reach 550° C. and above. In the course of this exotherm, the ECU may momentarily cause a change in the exhaust gas composition of the lean exhaust gases to produce a rich pulse (lambda less than 1.0) sufficient to desorb the retained SOx from the NOx adsorber catalyst. Under the reducing conditions of this rich pulse, all or part of the released SOx will be reduced to $H_2S$ over the NOx adsorber catalyst. The Y configuration described in this patent suppresses the emission of any amount of $H_2S$ released from the NOx adsorber by recombination of the rich $H_2S$ containing exhaust stream with a lean exhaust stream provided through the opposite engine manifold. After the recombination of both exhaust streams, $H_2S$ is oxidized back to $SO_2$ over the DOC thus preventing the release of the more toxic and malodorous $H_2S$ in the environment.

In the case of a catalyst system that combines a CSF with a NOx adsorber catalyst, both catalyst functions may be separated in two individual converter units or combined in one converter unit. The above deSOx regeneration strategy of the NOx adsorber catalyst applies to all combinations of the CSF and NOx adsorber catalyst as long as both catalyst functions are positioned in one exhaust leg.

In accordance with yet another aspect of the invention, the ECU controls the exhaust gas composition in each leg of the exhaust system in a known manner, such as by controlling the following engine components:
  i) the fuel injectors to control the A/F ratio and/or to control the timing of the combustion within the cylinders such as by conventional pilot or post injection techniques or other staging techniques as disclosed for example in Mitsubishi U.S. Pat. No. 6,209,516 to Yamashita dated Apr. 3, 2001 (incorporated herein by reference and made a part hereof) including the pumps controlling the rail pressure for fuel injectors;
  ii) a) the variable geometry turbocharger and/or waste gate control or b) engine throttle(s) in the intake manifold whether a common intake manifold or separate intake manifolds for each bank of cylinders are employed;
  iii) valve actuators to control valve timing; and,
  iv) the valving for the EGR loop if an EGR system is employed.

In accordance with another aspect of the invention, an improved process for controlling noxious emissions produced by a vehicle equipped with a multi-cylinder diesel engine having separate first and second exhaust manifolds through which discrete first and second pluralities of cylinders, respectively, exhaust their products of combustion as exhaust gases with the engine having a programmable ECU controlling the composition of exhaust gases in each exhaust manifold. The method includes the steps of
  a) providing a first NOx adsorber catalyst downstream of and in fluid communication with the first exhaust manifold through which a first steam of exhaust gases from the first exhaust manifold pass and a second NOx adsorber catalyst downstream of and in fluid communication with the second exhaust manifold through which a second stream of exhaust gases from the second exhaust manifold pass;
  b) combining the exhaust gas streams downstream of the first and second NOx adsorber catalysts into a common exhaust stream to produce a substantially mixed common stream of exhaust gases from the first and second exhaust streams;
  c) passing the combined stream of exhaust gases through an oxidation catalyst; and
  d) controlling by the ECU the composition of the exhaust gases in the first exhaust stream independently of the composition of exhaust gases in the second exhaust stream to periodically produce a rich exhaust stream passing through one of the NOx adsorber catalysts for regeneration thereof and a lean exhaust stream passing through the other NOx adsorber catalyst to assure a lean combined exhaust stream passing through the oxidation catalyst to minimize HC and CO slip. Periodically, the composition of the exhaust gases in the first and second exhaust manifolds are reversed so that both NOx adsorber catalysts are regenerated.

In accordance with another aspect of the invention, the process or the periodic routine may be activated when the diesel engine is in a normal operating state, or alternatively stated, the process or routine may be deactivated when the engine is under high load such as when the vehicle is fully accelerating whereby engine driveability is not adversely affected by the inventive emission control system.

In accordance with another aspect of the invention, conventional sensor arrangements such as NOx sensors are utilized to determine the current state of the catalysts to activate the process and current sensors, such as lambda sensors, are used to deactivate the process so that the switching and duration during which the rich and lean streams are generated are inherently keyed to actual performance of the NOx catalysts and regeneration may be set at levels less than saturation levels of the NOx catalyst to enhance reduction of released NOx and promote catalyst life.

In accordance with yet another aspect of the invention, the periodic rich/lean routine described above is not actuated unless the catalyst active temperature window is present to assure that desired regeneration occurs.

Another aspect of the invention is the provision of an emission control system especially suited for diesel engines that accomplishes one or more of the following:
  a) reduced fuel consumption especially when compared to external reductant systems;
  b) applicable to space saving installations necessary for automotive application;
  c) suitable for light duty diesel application; and,
  d) does not require additional components not already present on vehicles.

These and other objects, features or advantages of the invention will become apparent to those skilled in the art upon reading and understanding the Detailed Description of the Invention set forth below.

BRIEF DESCRIPTION OF THE DRAWINGS

The invention may take form in certain parts arrangement of parts, a preferred embodiment of which will be described in detail and illustrated in the accompanying drawings which form a part hereof and wherein.

DETAILED DESCRIPTION OF THE INVENTION

Figure 1:
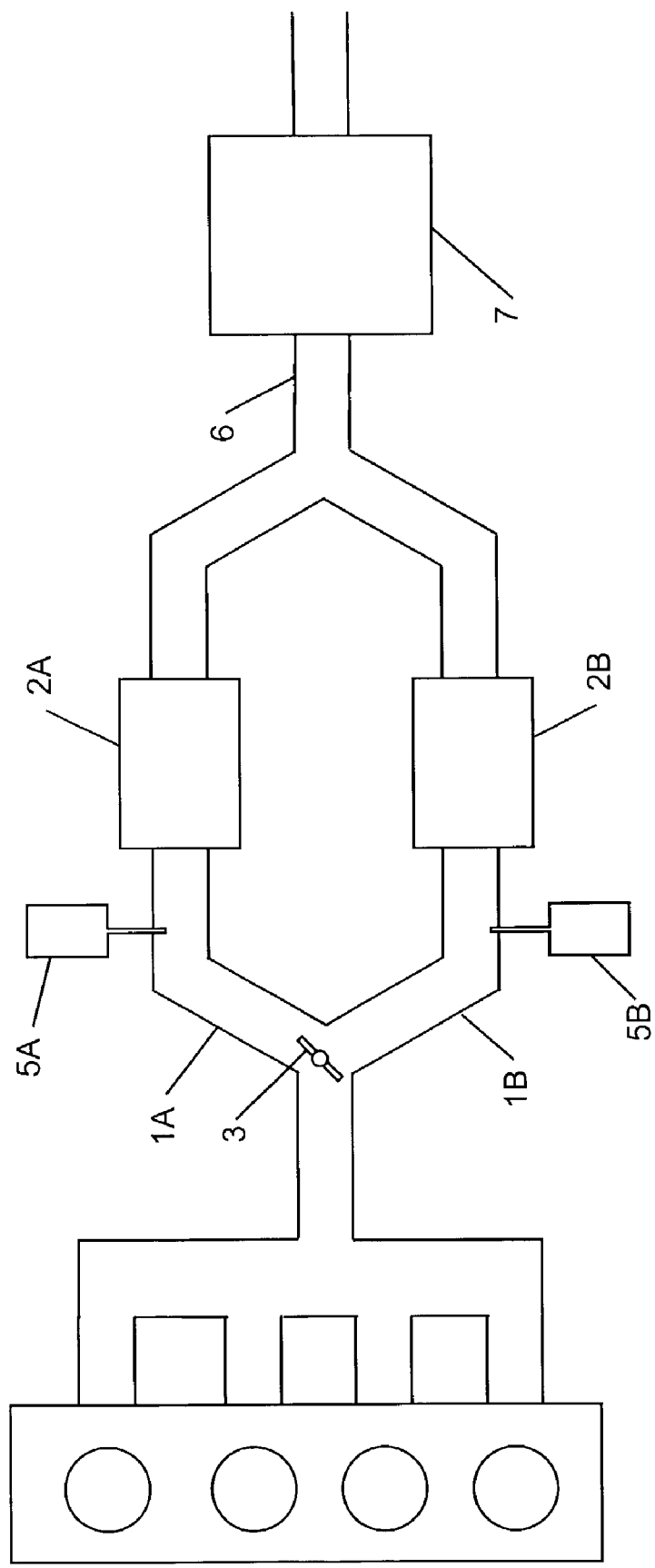
FIG. 1 is a prior art schematic of an emission control system for use with diesel powered vehicles.
Figure 2:
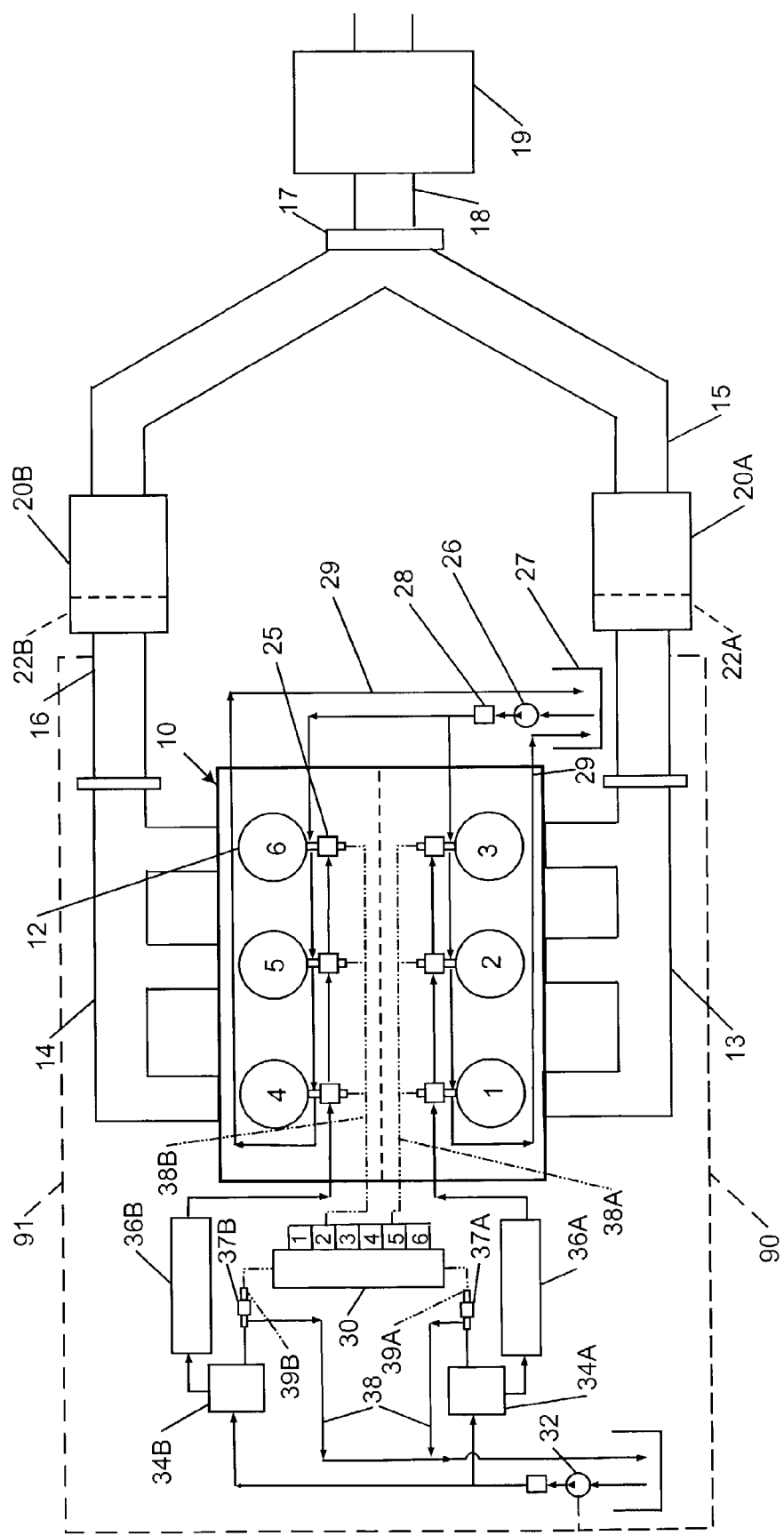
FIG. 2 is a schematic representation of one embodiment of the emission control system of the present invention.

Referring now to the drawings wherein the showings are only for the purpose of disclosing a preferred embodiment of the invention and not necessarily for limiting the same, there is shown in FIG. 2 one schematic representation of a preferred embodiment of the inventive emission control system. In FIG. 2 there is depicted a multi-cylinder diesel engine 10 having two banks or pluralities of cylinders 12, with each cylinder bank exhausting products of combustion to an exhaust manifold 13, 14. For FIG. 2 cylinders 1, 2 and 3 make up the "first" or "A" cylinder bank and exhaust their combustion products into first exhaust manifold 13 and cylinders 4, 5 and 6 make up the "second" or "B" cylinder bank and exhaust their products of combustion into second exhaust manifold 14. First exhaust manifold 13 is in fluid communication with a first exhaust leg 15 and second exhaust manifold 14 is in fluid communication with a second exhaust leg 16. Each exhaust leg 15, 16 communicates with an inlet 17 of a common exhaust leg 18.

The Emission System

This invention is not limited to any specific catalyst, catalyst formulation or catalyst arrangement. It applies to any known catalyst which adsorbs or traps NOx when the exhaust gas is lean and releases the stored NOx when the exhaust stream is rich (alternatively, when the oxygen concentration of the exhaust gas is lowered) and all such catalysts, for ease in usage and definitiveness in terminology, will be referred to herein as "adsorber catalyst," notwithstanding that the term "adsorber catalysts," in the trade, has a distinct meaning. To differentiate, the typical adsorber catalyst will be referred to herein as a "classical adsorber catalyst" to distinguish from the all encompassing "adsorber catalyst" terminology.

Technically, it is of course recognized that "adsorption" means accumulation of molecules, atoms or ions from the gas phase or from the liquid phase onto a surface in systems that contain gas/solid or liquid/solid interfaces, respectively. The term also extends to gas/liquid systems in which adsorption means that a molecule, atom or ion contained in the gas phase collides with the surface of the liquid phase and sticks to the surface. "Absorption" means accumulation of molecules, atoms or ions in the bulk of a solid or liquid. Absorption requires adsorption in the first place.

During the storage of NOx over the NOx adsorber catalyst, NOx is first adsorbed on the catalyst surface (both PM (precious metals) and NSC (NOx storage components)). Part of the adsorbed NOx can, however, react with the NSC to form a bulk nitrite and/or nitrate. The latter process would be an adsorption process as NOx is reacting with the NSC material to form a bulk compound. Insofar as the terminology of this invention is concerned, "adsorber" and "adsorbtion" when used singularly or in combination with "adsorber catalyst" is intended to not only include adsorption, in its technical sense, but also absorption insofar as it occurs in a NOx reducing catalyst.

This should be clear when it is considered that storage of $NO_2$ over BaO (an NSC material) proceeds through the following steps:

$$4NO_2 + 2BaO \rightarrow Ba(NO_2)2 + Ba(NO_3)2 \quad (1)$$

$$Ba(NO_2)2 + 2NO2 \rightarrow Ba(NO_3)2 + 2NO \quad (2)$$

$$Ba(NO_2)2 + O_2 \rightarrow Ba(NO_3)2 \quad (3)$$

$$4NO_2 + 2BaCO_3 \rightarrow Ba(NO_2)2 + Ba(NO_3)2 + 2CO_2 \quad (4)$$

where Ba(NO_2)2 is barium nitrite and Ba(NO_3)2 is barium nitrate.

In equation (1) BaO can be replaced with $BaCO_3$ leading to reaction (4). Note that above reactions do not specify whether nitrites or nitrates are formed on the surface or in the bulk of the NSC. Thus "adsorption" and "adsorb" includes, when used herein, "absorption" and "absorb," respectively.

In all embodiments of the invention, an NOx adsorber catalyst 20A is positioned in first exhaust leg 15 and an identical NOx adsorber catalyst 20B is positioned in second exhaust leg 16.

In one embodiment, adsorber catalysts 20A, 20B are classical adsorber catalysts. As is well known, the operation of a classical adsorber catalyst proceeds in steps and the catalyst exhibits both oxidation and reduction functions. In an oxidizing environment, NO is oxidized to $NO_2$, which at low temperatures is typically catalyzed by a precious metal, i.e., Pt, which is an important step for NOx storage. However, the oxidation does not stop at $NO_2$ but continues with further oxidation of $NO_2$ to nitrate with incorporation of an atomic oxygen from the NSC. The NSC is believed to undergo for base metal compounds, carbonate/nitrate conversions relate to rich/lean operations (carbonates are formed during rich operation while nitrates are formed during lean operation). For the reductant role, the precious metal first catalyzes the release of NOx upon introduction of a reductant (i.e., CO and/or HC). This may recover some NOx storage sites but does not contribute to any reduction of NOx. The released NOx is then further reduced to $N_2$ in a rich environment (HC, CO). Base metal compounds are believed to undergo a carbonate/nitrate conversion or a dominant path, during lean/rich operations.

The classical adsorber catalyst typically comprises one or more platinum group metals, a NOx storage material (NSC), i.e., an alkaline or alkaline earth metal oxide, where both PM and NSC compounds are supported on an oxidic support, e.g., $Al_2O_3$, $ZrO_2$, $TiO_2$ and mixtures thereof. In order to permit gas stream contact for gas phase NOx reduction, the catalytic material is applied as a coating on a carrier which has a physical structure that allows the gas stream to flow therethrough in contact with the catalytic material at a temperature sufficient to support the reduction reaction, e.g., at least about 150° C. The preferred carriers comprise ceramic-like materials such as cordierite, .alpha.-alumina, mullite, and the like, while others may comprise refractory metals such as stainless steel. One typical kind of carrier comprises a body of cylindrical configuration (which in cross section may be circular, oval or polygonal) having two end faces and a plurality of fine, substantially parallel gas flow passages extending therethrough and connecting the end faces of the carrier to provide a "flow through" type of carrier. Such carriers may contain up to about 700 or more flow channels ("cells") per square inch of cross-sectional flow area, although carriers having far fewer cells per square inch ("cpsi") may also be useful. For example, typical carriers have from about 200 to 400 cpsi. Reference may be had to assignee's U.S. Pat. No. 6,150,291 to Deeba et al., dated Nov. 21, 2000 (incorporated herein by reference and made a part hereof), for specific composition examples of such NOx adsorber catalyst.

In another embodiment of the invention, lean NOx catalyst are placed in both exhaust legs instead of NOx classical adsorber catalysts. In principle, the same problem of CO/HC slippage arises during operation of a hydrocarbon lean NOx catalyst. In order to reduce NOx with HCs under lean conditions, the C:N atomic ratios of hydrocarbons to NOx present in the exhaust gas needs to be raised from its normal value which is ≦1 to an elevated level above 1, which is typically in the range 4:1, but can go as high as 10:1. Increased HC raw emissions are a prerequisite for HC lean NOx reduction due to the inherent poor selectivity of the HC-NOx reaction compared to the HC-$O_2$ reaction. The C:N ratio employed with HC lean NOx catalysts must not exceed an upper limit to avoid HC poisoning of the lean NOx catalyst. Commonly, at elevated HC raw emission levels within the operational range of HC lean NOx catalysis, not all HCs are converted over the lean NOx catalyst resulting in HC slip. The low temperature lean NOx catalyst is platinum based (Pt-based) and does not have to have a zeolite present to be active, but Pt/zeolite catalysts are better and appear to have better selectivity against formation of $N_2O$ as a by-product than other catalysts, such as Pt/alumina catalysts. Generally, a low temperature lean NOx catalyst has catalytically active temperature ranges of about 180 to 350° C. with highest efficiencies at a temperature of about 250° C. High temperature lean NOx catalysts have base metal/zeolite compositions, for example Cu/ZSM-5. High temperature NOx catalysts have a lower temperature range of about 300° C.–350° C. with highest efficiency occurring around 400° C. This invention uses either high or low temperature lean NOx catalysts with an HC/CO reductant as NOx adsorber catalysts. As a matter of terminology, when fuel is combusted in the combustion chamber formed in the diesel engine's cylinder, gaseous products of combustion result. The portion of the products of combustion which are combustible (the "combustible" products of combustion) include HC and CO but are not necessarily limited thereto.

In accordance with another embodiment of the invention, NOx adsorber catalyst provides for abatement of NOx by a composition including a NOx abatement catalyst and a NOx storage material disposed in proximity to each other on a common refractory carrier member. The NOx abatement catalyst comprises a catalytic metal component comprised of a platinum catalytic metal component or one or more other platinum group metal catalytic compounds. It is believed that when the gas stream, e.g., engine exhaust, to be treated is lean, NOx contained in the gas stream is adsorbed onto the NOx storage material, thereby removing gaseous NOx from the exhaust gas emitted by the engine. The platinum catalytic component is believed to promote such adsorption. This lean adsorption occurs during a lean operating period which is terminated by rendering the gas stream rich, as may be accomplished by decreasing the air-to-fuel ratio of the combustible mixture fed to the engine generating the exhaust. Hydrocarbons and carbon monoxide or other suitable reductants in the gas stream will release the adsorbed NOx from the NOx storage material. The released NOx is subsequently reduced over the platinum metals by reaction with the reductants to form $N_2$. Part of the released NOx may also be reduced to $N_2O$. For specific examples of such NOx adsorber catalyst, reference may be had to assignee's U.S. Pat. No. 5,874,057 to Deeba et al., dated Feb. 23, 1999 (incorporated herein by reference and made a part hereof for the examples of such catalyst compositions so that a further description thereof need not be set forth in detail herein).

Other examples of NOx adsorber catalysts may be found in U.S. Pat. No. 5,727,385 (Hepburn); U.S. Pat. No. 5,750,082 (Hepburn et al.); U.S. Pat. No. 5,753,192 (Dolson et al.); U.S. Pat. No. 5,758,489 (Hepburn et al.); U.S. Pat. No. 5,795,553 (Lott et al.); and, U.S. Pat. No. 5,910,097 (Boegner et al.).

Figures 4, 5:
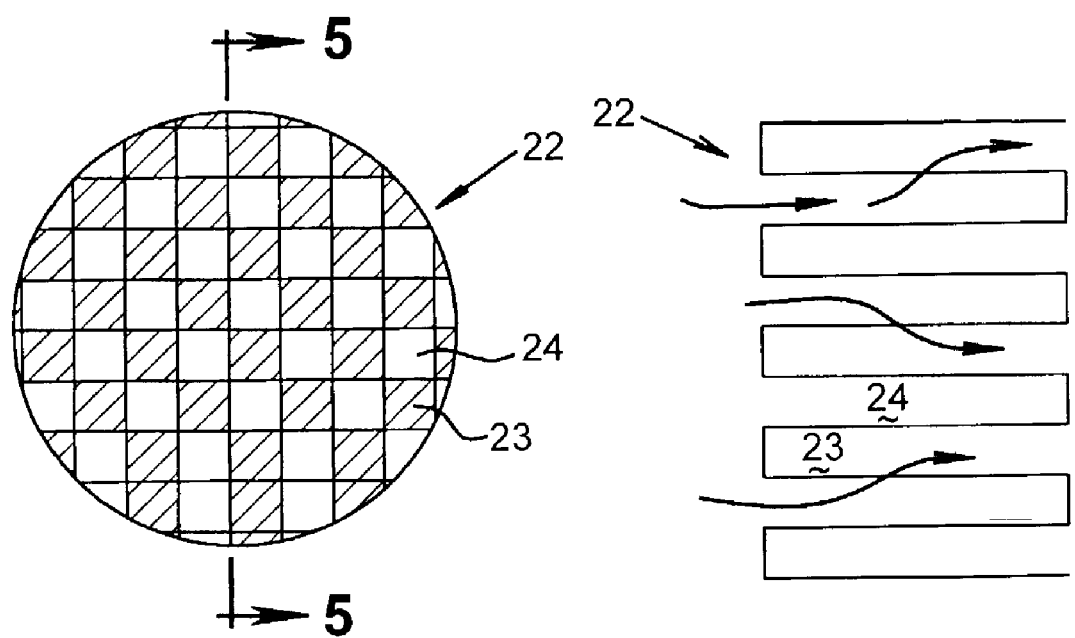
FIG. 4 is a schematic end view of a soot filter.
FIG. 5 is a schematic representation of a longitudinal view of the filter depicted in FIG. 4 taken along lines 5—5 thereof.

In accordance with another embodiment of the invention, a particulate or soot filter may be used in the system which is located in the same leg as the NOx adsorber catalyst. It is to be recognized that a catalyzed soot filter (CSF) can be used in any number of arrangements or combinations with an NOx adsorber catalyst (with each combination having advantages and disadvantages) and all such combinations or arrangements can be employed in the present invention. For example, the CSF can be placed upstream or downstream of the NOx adsorber catalyst or can be coated on or contained within an NOx adsorber catalyst. Preferably, a catalyzed soot filter of the "wall flow" type is used. As schematically indicated in FIGS. 4 and 5, a catalytic material is deposited on a carrier of a type usually referred to as honeycombed or as monolith carriers comprising a unitary body, generally cylindrical in configuration, having a plurality of fine, substantially parallel gas flow passages or channels extending therethrough. When the channels are open-ended, the carrier is referred to as a "flow through" carrier. When each channel is blocked at one end of the carrier body, with alternate channels blocked at opposite end-faces the carrier is referred to as a wall-flow carrier (or filter). The wall-flow carrier as well as the catalytic material deposited thereon is porous so that exhaust gases can flow through the walls of the carrier (and without creating excessive backpressure on the engine). The monolithic carrier body is preferably comprised of ceramic-like materials such as cordierite, %-alumina, silicon carbide, silicon nitride, zirconia, mullite, spodumene, alumina-silica-magnesia or zirconium silicate. The catalyst is coated or dipped or sprayed onto the carrier and may be of a composition such as disclosed in assignee's U.S. Pat. No. 5,100,632 to Dettling et al., issued Mar. 31, 1992, entitled "Catalyzed Diesel Exhaust Particulate Filter" or even the catalyst composition utilizing zeolites disclosed in assignee's U.S. Pat. No. 5,804,155 to Farrauto et al., issued Sep. 8, 1998, entitled "Basic Zeolites as Hydrocarbon Traps for Diesel Oxidation Catalysts". Both the '632 and '155 patents are incorporated by reference herein for their disclosure of the catalyst compositions applied to the carrier of the catalyzed soot filter used in the preferred embodiment of this invention. An example of an acceptable catalyzed soot filter is Engelhard Corporation's, filter catalyst designated MEX 003. This catalyst is comprised of 250 g/ft$^3$ $ZrO_2$ applied to the soot filter substrate by solution impregnation as zirconium acetate solution and then dried, plus 500 g/ft$^3$ $CeO_2$ applied next by solution impregnation as cerium (III) nitrate/citric acid solution (Ce:citrate mole ratio=1:1) and then dried and calcined at 450° C., plus 75 g/ft$^3$ platinum applied by solution impregnation as amine-solubilized Pt(IV) hydroxide (i.e. Pt "A" Salt) which was then dried and calcined at 450° C.

FIGS. 4 and 5 schematically show end and side views, respectively, of a wall flow filter 22. The porous or gas permeable walls of wall flow filter 22 form channels with the interior surface of any given wall forming a portion of a channel and the exterior surface of the same wall forming a portion of an adjacent channel. Channels in the wall flow filter have the conventional checkerboard pattern (FIG. 5) which have alternating closed 23 and open 24 channels to the entry side of the exhaust (FIG. 16). All channels are catalyzed as discussed above for purposes of explanation. Nitric oxide, NO, and soot enter open channels 24. It is believed NO oxidizes by reaction with the catalyzed surface on inlet channel 24 and changes to $NO_2$. As is well known, soot gets trapped by wall flow filter walls which allow exhaust gas to pass therethrough as shown by arrows 21. However, $NO_2$ formed in inlet channel 24 reacts with the soot trapped on each inlet channel's walls and reduces to NO. Reaction by $NO_2$ with soot is beneficial to the filter (maintains cleaner filter, less backpressure, etc.) and to the emission process. ($NO_2$ is highly reactive with carbonaceous material.) Nitric oxide, NO, entering closed channel 23 now reacts with catalyst on the wall surfaces of closed channel 23 and oxidizes to $NO_2$. The $NO_2$ is believed advantageous for storage of NOx over the NOx adsorber catalyst 20.

As noted above, the diesel exhaust is a heterogeneous material which contains pollutants such as carbon monoxide (CO), unburned hydrocarbons (HC), nitrogen oxides (NOx), as well as soot particles. Soot particles compose both a dry, solid carbonous fraction and a soluble organic fraction. The soluble organic fraction is sometimes referred to as a volatile organic fraction (VOF or SOF) which may exist in diesel exhaust either as a vapor or as aerosol (fine droplets of liquid condensate) depending on the temperature of the exhaust gas. The catalyst on the soot filter oxidizes the VOF retarding or minimizing CSF blockage or inhibiting decrease in permeability of the wall-flow filter's channels. The soot filter also oxidizes HC and CO to convert these pollutants into "benign" emissions. It should also be noted, the catalyst soot filter also oxidizes nitric oxide, NO, (which is generally known to comprise a majority of the NOx with majority meaning at least about 50% or more of the NOx emissions produced be engine 10) to $NO_2$ which on contact with VOF readily reduces to NO and is thus beneficial to the life of the CSF catalyst. Once the NO passes through the channel wall it again contacts the catalyst and oxidizes to the $NO_2$ state which, in that form of NOx, is believed beneficial to the NOx adsorber catalyst. It is therefore possible to construct a single catalyst brick which has a catalyzed soot filter at its entrance portion and a lean NOx catalyst extending over its exit portion. This is schematically indicated in FIG. 2 by the dotted line at the front of each NOx adsorber catalyst 20 which indicates that the front portion of each NOx adsorber catalyst 20A, 20B has as a portion of its substrate, a catalyzed soot filter 22A, 22B respectively. See for example assignee's U.S. Pat. No. 6,375,910 to Deeba et al. entitled "Multi-zoned Catalytic Trap and Methods of Making and Using the Same," issued Apr. 23, 2002. Both catalyzed soot filter and NOx adsorber catalysts 22A, 20A and 22B, 20B could, of course, be separate and combined in a single cover or simply be separate from one another.

Referring still to FIG. 2, first and second legs 15, 16 combine at an inlet 17 of a common exhaust leg 18 which carries an oxidation catalyst 19 downstream of inlet 17. The inlet of oxidation catalyst 19 is far enough away from inlet 17 of common exhaust leg 18 to assure that both exhaust streams in first and second legs 15, 16 have been thoroughly mixed into a common stream prior to entering oxidation catalyst 19. Oxidation catalyst 19 is entirely conventional and typically comprises a platinum group metal dispersed on a refractory metal oxide. An example of an oxidation catalyst suitable for use in the present invention is disclosed in U.S. Pat. No. 6,274,107 to Yavuz et. al entitled "Zeolite-Containing Oxidation Catalyst and Method of Use) which is incorporated by reference herein for the disclosure of the composition of an oxidation catalyst. As will be discussed below, it is known the exhaust gases leaving the catalyzed soot filter can heat the substrate of the NOx adsorber catalyst to higher temperatures whereat known rich pulses can release and reduce the sulfur trapped in the NOx filter. As the temperature of the NOx adsorber catalyst is raised, its ability to trap NOx diminishes. That is, the temperature window whereat the NOx adsorber catalyst is catalytically active to store NOx is typically lower than the temperature "window" whereat the NOx adsorber catalyst is catalytically active to release stored sulfur. The inventive system can advantageously use this known technique of releasing stored sulfur during its rich/lean purge cycle.

The Control System

In the preferred embodiment, engine 10 is equipped with a hydraulically pressurized rail fuel control system of the type typically used for fueling light duty diesel engines although other fueling systems can be employed. That is while the invention has specific application to light duty diesel engine powered vehicles, the invention in its broader sense has application to heavy duty diesel powered vehicles using HEUI (hydraulically actuated, electronically controlled, unit fuel injectors) systems.

In FIG. 2, a HEUI system modified in a manner to permit independent control of the cylinder banks is disclosed. Each cylinder 12 is provided with a fuel injector 25 of the unit injector type. (See Glassy U.S. Pat. No. 5,191,867 incorporated herein for its disclosure of a unit injector and HEUI system.) A low pressure fuel pump 26 draws fuel from the vehicle's fuel tank 27 and conditions the fuel at a conditioning station 28 before pumping the fuel to individual injectors 25 as shown. One or more fuel return lines 29 is provided. The fuel supply system as shown is separate and apart from the hydraulic system which actuates fuel injectors 25.

Fuel injectors 25 are actuated by hydraulic pressure which, in turn, is regulated by signals generated by the engine's electronic control unit, ECU, 30. Typically a low pressure pump 32 charges the inlet of a high pressure pump 34 whose outlet pressurizes a rail 36 in fluid communication with each fuel injector 25 for actuation thereof. Pressure in the rail is determined by a throttling rail pressure control valve 37 which dumps high pressure pump flow to return on return lines 38.

In the embodiment disclosed in FIG. 2, the rail system is split to permit independent fueling control for each cylinder bank. The first and second cylinder banks are provided with their own high pressure pump 34A, 34B, their own rails 36A, 36B, and their own pressure control valves 37A, 37B. However, those skilled in the art will recognize that alternative valving arrangements could be employed so that only one high pressure pump 34 is needed or the design of the fuel injectors may be such that the fuel injectors will properly actuate each cylinder bank with a common rail at a common pressure, or entirely different fueling arrangements can be used.

ECU 30, in response to a number of sensed variables, generates electrical control signals for each cylinder's fuel injector 25 which are shown inputted at 38A to a solenoid valve in each fuel injector 25 in the first cylinder bank and inputted at 38B to a solenoid valve in each fuel injector in the second cylinder bank. As is well known, the solenoid valve controls pulsing of the fuel injector. ECU 30 also generates control signals which are shown inputted at 39A, 39B for regulating each rail pressure control valve 37A, 37B, respectively, to set the pressure of engine oil pumped to fuel injectors 25. It is believed sufficient to note that in response to a number of input signals which represents any number of variables needed by ECU 30 to determine fueling of engine 10, ECU 30 generates output signals which for the FIG. 2 embodiment take the form of signals 38A, 38B to control fueling of engine.

Figure 3:
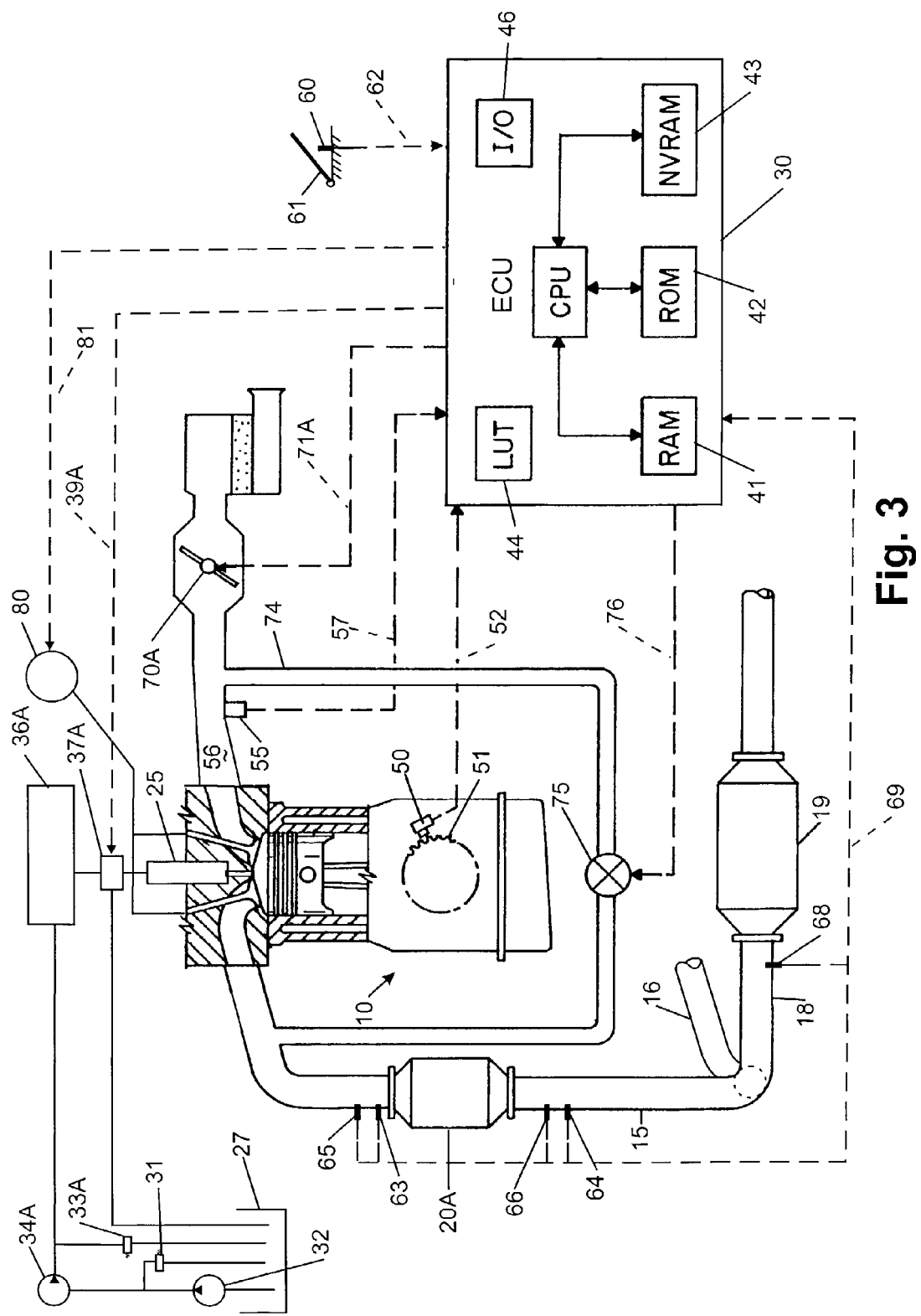
FIG. 3 is a schematic representation of a preferred embodiment of the emission control system depicted slightly differently than that shown in FIG. 2.

Referring now to FIG. 3, there is shown a rail system more typical of that used for light duty diesel vehicles. It is believed that the rail system of FIG. 3 provides for a wider A/F control range than that disclosed in FIG. 2 and the rail system of FIG. 3 is thus preferred. (Again, the invention is also applicable to heavy duty diesel engines and if a modified HEUI system, such as shown in FIG. 2, is insufficient in and of itself to provide the desired lean/rich engine exhaust compositions, other known engine operating techniques can be additionally employed. For example additional exhaust leg fuel injectors shown as dashed lines 90, 91 in fluid communication with low pressure pump 32 as is known in the prior art can be provided. With the present invention, less external fuel through the leg injectors is required than prior art arrangements which supplied the additional reductant required solely through the exhaust leg injectors.) Reference numerals used in FIG. 2 describing the rail system will apply to like components in the rail system illustrated in FIG. 3. In the FIG. 3 embodiment, split rails are utilized with only rail 36A illustrated. As in FIG. 2, low pressure pump 32 which is pressure regulated by valve 32 charges high pressure pump 34A. High pressure pump 34 which is also pressure regulated by high pressure regulating valve 33A charges split rail 36A with fuel at a set pressure determined by regulating valve 33A. Solenoid or an electromagnetic valve 37A supplies fuel at high pressure from split rail 36A to injector at timed increments for fueling engine 10. The rail embodiment of FIG. 2 uses rail pressure to operate the fuel injector with the fuel separately supplied while the rail embodiment of FIG. 3 uses fuel oil to both supply pressure and fuel the engine.

ECU 30 is conventional and includes well known elements such as a central processing unit or CPU 40, RAM (Random Access Memory) 41, ROM (Read Only Memory) 42, and NVRAM (Non-Volatile Random Access Memory) 43. Also shown is a look-up table (LUT) 44 separate and apart from ROM 42 (or alternatively, included as a component of ROM 42). Also shown is a conventional input/output (I/O) unit 46 for receiving and transmitting instructions from and to ECU 30. ECU 30 operates in a well known manner to control engine 10 and process engine control and diagnostic routines, such as stored by step-by-step instructions in ROM 42. As is well known, engineering operating parameters are read into ECU 30 as input signals which are then processed into output signals or control signals outputted from ECU 30 to actuators on the vehicle controlling vehicular operation, specifically, operation of engine 10.

There are a number of sensors which generate engine operating information that is inputted to ECU 30 and are used to control operation (fueling) of engine 10. Several sensors are diagrammatically illustrated in FIG. 3 and include a timing pick-up unit 50 shown sensing rotation of engine flywheel 51 and generating a timing signal on dash-line 52 to ECU 30. The input signal on timing signal line 52 can be viewed as an input sensor signal generating vehicular speed information, timing information whether for fuel, or valve, or engine torque information. Additionally, an air flow sensor 55 senses mass air flow in intake manifold passage 56 and generates an input signal on air sensor dash-line 57 to ECU 30. Air signal line 57 can also be viewed as carrying sensor information for manifold air pressure. Also shown is a throttle sensor 60 associated with the operator controlled accelerator pedal 61 generating an acceleration signal on acceleration sensor dash-line 62. The engine sensors shown in FIG. 3 are merely indicative of a methodology to extract engine data of a type which is useful in implementing the inventive emission system and are not to be construed as limiting the invention. Those skilled in the art will recognize that there are any number of methods used in the engine control art that cause ECU 30 to generate actuator command signals and this invention contemplates the use of any such control methodology to generate the desired exhaust emissions.

Importantly, there are one or more emission sensors in the catalyst exhaust system which generate an input signal to ECU 30 indicative, directly or indirectly, of the emissions exhausted to atmosphere and the functioning of the catalysts. The sensors shown in FIG. 3 are for discussion purposes only and may or may not represent the actual sensor placement in the catalyst system of the invention. Preferably, there is an upstream 63 and downstream NOx sensor 64 in each exhaust leg 15, 16 for each NOx adsorber catalyst 20 and are utilized to generate a difference signal indicative of the current state of NOx adsorber catalyst 20. (Alternatively only one downstream NOx sensor may be utilized where engine out NOx emissions are determined from a NOx map. The NOx map may provide current NOx emissions as a function of engine speed and load and can be implemented in the ECU.) Similarly, there are also positioned lambda sensors 64, 65 upstream and downstream, respectively, of NOX adsorber catalyst 20. Conceptually, the NOx sensors can be viewed as generating a signal indicative of the saturation level of the NOx storage sites in the NOx adsorber catalyst, i.e., the signals provide an indication of when the NOx adsorber catalyst has been regenerated. Additionally an EGO sensor 68 upstream of DOC catalyst 19 is utilized to determine the lean/rich composition of the combined exhaust gases in combined leg 18 prior to entering DOC catalyst 19. All sensors 63, 64, 65, 66 and 68 output their emission sensor signals to ECU 30 on sensor dash line 69.

This invention varies the operation of engine 10 so that one group or bank of cylinders can produce an exhaust gas in its exhaust gas manifold which is rich or stoichiometric and thus capable of regenerating its NOx adsorber catalyst while the other group or bank of cylinders can produce a "normal" diesel exhaust gas in its exhaust gas manifold which is lean past stoichiometric generating NOx emissions adsorbed in its NOx adsorber catalyst. The operation of engine 10 is such that when the rich gas regenerates one NOx adsorber catalyst, the fueling of the cylinders bank is switched. This is accomplished by programming a routine into ECU 30 which, in response to one or more of the sensor signals described above (or alternatively on a periodic, timed basis), initiates a number of computations, steps or instructions which result in a command signal being issued by ECU 30 to at least one actuator for controlling that actuator. Conceptually, in its broader sense, the inventive system executes a programmable routine that produces one or more varying command signals to one or more actuators to control the engine operation so that the exhaust gas for one bank of cylinders is rich meaning lambda is 1.00 or less and the exhaust gas for the other bank of cylinders is lean meaning lambda is at least 1.0 or more and preferably 2.5 or greater. This programmable routine will be referred to as the "rich/lean" routine. The routine can then additionally switch the command signals from one cylinder bank to the other when regeneration of the NOx adsorber catalyst receiving the rich exhaust stream has been completed or has been regenerated to a preset extent. The actual programmable routine will not be set forth in detail herein because it is well within the skill of a computer programmer to develop such a routine once the actuators controlled by the routine, the input signals and the events to be controlled by the programmable routine are known. The sensor signals have been generally defined above. Some "actuators" which can control the rich/lean makeup of the exhaust gases are set forth below. Within the engine art, it is believed well known to use any number of fueling techniques to produce any number of specific exhaust gas compositions by controlling the combustion of the fuel. This invention contemplates the use of any such known techniques to produce the desired rich/lean exhaust gas compositions required for regeneration of the NOx adsorber catalysts. The discussion below centers about actuators which are known to control the NOx content in the engine exhaust gas.

a) Fuel Injector

Perhaps the easiest way to change the composition of the exhaust gases is to simply change the A/F ratio by varying the fuel supplied injector 25 vis-a-vis the pulse output signal from ECU 30 on line 39 for the FIG. 3 embodiment (lines 39 and 38 for the FIG. 2 embodiment). As used in this Description pulse width includes not only the duration of the pulse (and how the pulse may be varied during the duration it is on) but also the time at which the pulses are generated. Reference may be had to Chrysler U.S. Pat. No. 5,261,366 to Regueiro, entitled "Method of Fuel Injection Rate Control," issued Nov. 16, 1993, which is incorporated by reference herein for a showing of how to vary the rail pressure and the fueling by individual injectors by sensor signals, including manifold pressure, crankshaft position, etc. Therefore, the programmable routine could conceptually simply amount to sensing the mass air flow signal on line 57, the crankshaft timing position signal on timing sensor line 52 and accessing appropriate look up tables 44 to determine a quantity of fuel sufficient to produce an A/F ratio that will be rich for one bank of cylinders and lean for the other cylinder bank. ECU 30 will then issue appropriate solenoid actuator signals on lines 39A and 39B to produce the desired rich and lean exhaust gas compositions. It should also be mentioned in this regard that it is well known to inject the fuel at separate times during the compression stroke, such as for example a pilot injection well before TDC (top dead center) and a main injection stroke about TDC. In this regard, the change-over from rich to lean can simply amount to a change in timing of the pilot and main injection fuel pulses as shown in Daimler-Chrysler U.S. Pat. No. 6,082,325 to Digeser et al., entitled "Process and System for Operating a Diesel Engine," dated Jul. 4, 2000, with FIG. 3 thereof, and the accompanying explanation of that figure incorporated by reference herein. The programmable routine of the present invention, sensing the input signals set forth in the '325 patent would then cause a timing shift of the pilot and main injection pulses for the rich exhaust cylinder bank while maintaining the normal timing for the pilot and main injection pulses for the lean exhaust cylinder bank. On regeneration, timing signals for the cylinder banks would shift.

b) Air Throttle With or Without EGR

The A/F ratio is also affected by the air flow through intake manifold 56. Most diesel engines are equipped today with variable geometry turbochargers (VGT) which have internal geometry (variable impeller blade angles) which establish air flow conditions in intake manifold 56. Diesel engines with VGT may or may not have a throttle plate 70 in the intake manifold. For discussion purposes, the FIG. 3 embodiment shows a throttle plate 70 regulated by a command signal from ECU 30 on dash air throttle command line 71. Further, it can be assumed that separate throttles 70A (70B not shown) are provided for each cylinder bank so that air flow to each cylinder bank can be independently controlled. Other air flow arrangements will suggest themselves to those skilled in the art and the invention is not limited to the two throttle arrangement illustrated in FIG. 3. The injector 25 in combination with air throttle plate 70 is typically controlled in unison to set the A/F ratio. Also, engine 10 is typically equipped with an EGR (exhaust gas recirculation) loop 74 with EGR valving 75 under the control of ECU 30 through dash EGR control line 76. The injector, air throttle and EGR are under the control of ECU to produce and vary the lean/rich gas streams in the first and second exhaust manifolds 13, 14. Reference may be had to Mazda U.S. Pat. No. 6,354,269 to Saito et al., entitled "Method and System for Controlling Engine" issued, Mar. 12, 2002, for a regeneration arrangement where a turbocharged diesel engine is controlled with air pressure generated by the turbine admitted to the combustion chamber of the cylinder, followed by valved opening of the EGR loop and finally increase in fuel from the injector to produce the rich exhaust gas mixture for regeneration of the NOx catalyst. To a similar affect is Nissan U.S. Pat. No. 6,026,790 to Itoyama, entitled "Diesel Engine Emission Control System," issued Feb. 22, 2000, sensing EGR and controlling air intake and fuel in response to the sensed values of the EGR. The control schemes disclosed in the '269 and the '790 patents are also incorporated by reference herein because they can be utilized in controlling the bank of cylinders which produce a rich gas stream and simultaneously used for the other cylinder bank to produce lean gas streams.

c) Valve Timing

In addition, engine 10 may be equipped with a variable valve timing unit schematically represented by reference numeral 80 under the control of ECU 30 on dash valve control line 81. Reference can be had to Mitsubishi U.S. Pat. No. 6,209,516 to Yamashita, entitled "Control System and Control Method for Diesel Engine," issued Apr. 2, 2001, which discloses a variable valve timing unit that varies the time the intake valve is closed to vary the time in the compression stroke of the cycle when combustion occurs. In one of the operating modes, the particulates and NOx normally produced by the engine is reduced and the '516 patent switches from one combustion mode to the other depending on engine demands, but overall, the diesel emissions are reduced. The '516 patent concept can be utilized in the present invention. The first combustion mode disclosed in the '516 patent would have to be further modified to generate a rich gas stream by further modification of the injector pulse to produce excess fuel and/or a retardation of the air flow vis-a-vis air throttle plate 70.

The engine programmable routines discussed above are simply examples or illustrations and not necessarily limitations of the present invention. In summary, any of the known techniques discussed above or any of the engine control techniques known to those skilled in the diesel engine control art can be employed to produce in each cylinder bank an exhaust gas which can be rich or lean. Still further, it is known in the art to control the combustion in the combustion chamber of the diesel engine such that certain combustibles in the products of combustion will predominate in the exhaust gases. For example, the combustible CO can be made to be the predominant gas in the products of combustion or, alternatively, hydrocarbons (HC) can be made to predominate. Still further, in the lean exhaust gases produced, desired quantities of combustibles can be produced and certain combustibles can be made to predominate in the lean exhaust gases.

However, there are two additional requirements of the inventive system that have not been discussed before. The requirements of the system are a) that the engine must produce rich and lean exhaust gas streams such that when the streams are combined in combined exhaust leg 16, the combined stream is lean and b) the driveability of the vehicle can not be seriously compromised.

Bench tests have demonstrated that the first requirement, i.e., the combined exhaust streams, downstream of the NOx adsorber catalysts are lean, can be met. That is, it is possible to produce A/F rich and lean fueling ratios such that i) regeneration of the NOx adsorber catalyst 20 can occur and ii) the combined streams (rich and lean) can be lean. This is illustrated by the following table which shows the calculation results of oxygen concentration in recombined exhaust gas during NOx adsorber regeneration with 50% lean and 50% rich exhaust streams during engine operation at a constant speed.

Fuel H/C=1.84
$H_2$:CO, lean=0
Stoich A/F=14.466
Lambda=(act A/F)/(stoich A/F)

Specific Examples from Engine Bench:

|  | lean | rich |
|---|---|---|
| $\lambda$ | 2.27 | 0.907 |
| $O_2$, % | 11.7 | 2.1 |
| CO, ppm | 450 | 32655 |
| HC (C1), ppm | 2000 | 16500 |
| NO, ppm | 211 | 14 |
| net $O_2$, lean, % | 11.38 | |
| net $O_2$ deficit, rich, % | | −2.82 |
| net $O_2$, lean + rich, % | 8.56 | |

With:
(1) $\lambda$, CO, $O_2$, NO: measured in engine bench experiment (SAE2000-01-2911)
(2) HC: calculated from lambda formula (source: Jordan Lampert, Engelhard)
(3) $CO+0.5O_2=CO_2$
(4) "$CH_2$"+$1.5O_2$=$CO_2$+$H_2O$ (approximation: $CH_2$ instead of $CH_{1.84}$)
(5) $Vl_{lean}=Vl_{rich}$ (VL: exhaust gas flow rate)
(6) →Net $O_2$, lean/net $O_2$ deficit, rich=ppm $O_2$−0.5*ppm CO−1.5*ppm HC The requirement of a lean combined exhaust stream is necessary to avoid slip which otherwise can conceivably occur. That is, there is a potential for HC, CO and $H_2S$ (hydrogen sulfide) to slip past NOx adsorber catalysts during regeneration. By requiring the combined stream to be lean, sufficient oxygen is present when the slip passes over oxidation catalyst 19 to oxidize these harmful emissions to "benign" gases, i.e., $CO_2$, $H_2O$, and less toxic SOx gases. The available net oxygen in the combined stream is at least 2% of the composition of the exhaust stream. To avoid or minimize the potential for slip in commercial application, it is believed that higher percentages of net available oxygen in the combined exhaust stream such as at least 5% of the composition of the combined exhaust stream or even at least 8% of the composition of the combined exhaust stream can be employed.

Driveability tests have not been conducted as of the date of this invention. Because each bank of cylinders is separately controlled it is not expected that driveability will be significantly affected. The bank of cylinders operating lean will produce the same power as those operating rich (for example timing of injection of each cylinder bank will be set so that both cylinder banks equal the condition of torque neutrality). The additional amount of fuel that is injected in the rich operating cylinder relative to the fuel quantity injected into the lean operating cylinder will result in an increase in engine CO/HC emissions and raise the exhaust gas temperature thereby decreasing fuel efficiency.

It is contemplated that both cylinder banks will operate identically until the time the sensors indicate that one of the NOx adsorber catalysts 20A, 20B need to be regenerated. At that time, ECU 30 will cause engine 10 to enter into the "rich/lean" exhaust gas mode (but producing similar torque outputs for each bank to retain torque neutral condition).

There are, however, known conditions that must be met before the NOx catalyst can be regenerated. The temperature of the NOx catalyst bed must be within its catalytically active regeneration window. Thus, the programmable routine must determine if this condition is present before the rich/lean mode can be initiated. Also, if the rich/lean mode adversely affects driveability, the ECU must temporarily abate the regeneration routine during portions of the driving cycle where the engine is under load. For example, if the vehicle is under full acceleration (pedal sensor 60) or is traveling up a hill at constant speed under excessive load the rich/lean cycle may have to be temporarily abated. However, stopping and starting the rich/lean routine presents additional problems.

It is known that the adsorption/desorption characteristics of NOx adsorption sites in the NOx adsorber catalyst varies as the catalyst trap becomes saturated. If the catalyst is completely purged, the initial NOx storage sites in the catalyst have a strong affinity for storing NOx and do not readily desorb NOx. The converse is true for the last to fill NOx adsorption sites. If the catalyst is NOx saturated at the beginning of regeneration, many sites will release NOx and not all the NOx that is released will be reduced to nitrogen. That is, a burst of NOx will be produced at the onset of regeneration which will abate during regeneration. One plausible theory is that there is insufficient reductant quantity to cause reduction of all the NOx initially released during regeneration. If the regeneration occurs before NOx saturation (for example at 70% of saturation), NOx break through is diminished and the overall NOx efficiency increased.

Therefore, if the actuator(s) or engine control techniques can produce the desired rich exhaust gas composition without adversely affecting driveability, the rich/lean regeneration should stay continuously active when actuated. However, because of the separate cylinder bank control feature of the invention, there is diminished concern over how often the rich/lean mode is actuated and the saturation threshold at which the rich/lean mode is actuated can be reduced to diminish the adverse effects of the NOx break through. For example, regeneration may start when the saturation of the NOx adsorber catalyst is at 50%. In this state, the NOx adsorber sites tend to hold the NOx so that an abundance of reductant must be present for release of the trapped NOx. In conventional systems as described above, it is not practical to regenerate the NOx adsorber catalysts at low saturation limits because of driveability concerns. Also, if the NOx adsorber catalyst is regenerated at low saturation levels, it is possible that the life of the NOx adsorber catalyst is extended. As noted, it is known that the ratio of the combustibles can be controlled in the rich exhaust gases. Whether CO or HCs are more efficient to regenerate the NOx adsorber is temperature dependent. Generally, CO is better at lower temperatures. CO is also the cleaner reductant. HCs may leave coke on the catalyst surface. Accordingly, the exhaust gas control can be set to produce a predominance of a given reductant, preferably CO, in the exhaust gases to further enhance the regeneration of the NOx adsorber catalyst for the "rich" bank of cylinders.

In summary of this aspect of the invention, the rich exhaust gas composition is preferably set to have a high CO percentage of combustibles and purging or regeneration of the NOx adsorber catalyst is set to occur once a set percentage of NOx storage sites in the NOx adsorber catalyst have stored or trapped NOx. The regeneration can, in theory, occur once all the storage sites are full (saturation). However, because of the ability of this invention to instantaneously generate the rich gas, regeneration can be set at levels well below saturation thereby maintaining the efficiency of the NOx adsorber catalyst. For example, regeneration could occur at levels as low as 50% saturation. An additional benefit results if regeneration occurs at low levels of saturation because the quantity of stored NOx initially released on regeneration is lessened and the combustibles present in the exhaust stream are better able to reduce the released NOx. Similarly, stopping the rich exhaust gas does not have to occur at a time when all the NOx adsorption sites in the NOx adsorber catalyst have been purged of NOx. In practice, the start and stop points of the regeneration routine will be set at levels of saturation set as a function of the efficiency of any given NOx adsorber catalyst.

It is known that regeneration of the NOx adsorber catalyst occurs at relatively low exhaust temperatures, for example, 150° C. to 450° C., depending on the NOx trap catalyst formulation. This renders the NOx adsorber catalyst particularly applicable to light duty diesel engines which typically produce exhaust gas temperatures of about 250° C. Combustion of soot on the other hand requires, in effect, a sudden switch from NOx abatement to soot abatement, a condition requiring a higher temperature, typically 550° C. to 600° C. and oxygen. Catalyzed soot filters allow combustibles in lean exhaust gases at lower temperatures to react with oxygen and produce an exothermic reaction raising the temperature of the soot filter so that the soot can be incinerated and catalyzed soot filters are particularly well suited for light duty diesel engines. In this regard, it is known that the combustion of HC is more exothermic than that of CO. On a C-1 basis the enthalpies of combustion are 283 kJ/mol for CO and 588 kJ/mol for CH 1.84. Accordingly, in one embodiment of the invention, the engine can be controlled to produce lean exhaust gases having high percentages of HC.

During the active regeneration of the CSF from soot, temperatures in the CSF catalyst bed can reach or exceed 600° C. As a consequence of this exotherm, the NOx adsorber catalyst placed in the same exhaust leg as the CSF will also heat up. This condition can be exploited in order to regenerate the NOx adsorber from SOx by applying a rich pulse either during or preferably shortly after the CSF regeneration. During this rich pulse, sulfates that are stored on the NOx adsorber catalyst will be decomposed in the presence of reductants and subsequently reduced to form $H_2S$. The intermediate $H_2S$ emissions will then subsequently be oxidized to $SO_2$ over the DOC catalyst. In one embodiment, the CSF catalyst can be placed adjacent and upstream the NOx adsorber catalyst (as shown in FIG. 2). The bed temperature of the NOx adsorber catalyst will lag the bed temperature of the CSF and the temperature time lag can be computed and used to time the generation of the rich pulse to optimize utilization of the catalysts. (Temperature of the catalyst bed can be measured by thermocouples (not shown) or any number of well known algorithmic techniques using exhaust gas or engine temperature can be employed.) Again, the concept of coupling the NOx catalyst to the soot filter (catalyzed or not) so that the temperature of the NOx adsorber catalyst bed is raised and producing a rich combustible pulse (for a short duration) so that sulfur can be released and subsequently oxidized to SOx is known in the art. In this invention, it is possible during the rich/lean cycle for the exhaust gases directed to the lean NOx adsorber catalyst to be periodically varied so that the catalyzed soot filter is effective to incinerate the soot trapped in the soot filter. Still further, the conventionally known technique of pulsing a rich stream (in the "lean" exhaust leg) can be momentarily utilized to remove sulfur trapped in the NOx adsorber. Still further, to insure excess oxidation in the combined exhaust leg so that $H_2S$ slip cannot occur, when the cylinder bank producing lean exhaust gas momentarily changes to generate the rich pulse, the cylinder bank producing the rich exhaust gas can momentarily change to produce a lean exhaust gas so that the combined stream remains oxygen enriched. (It is understood that the "pulse" or momentary abatement as used herein may range from several seconds to several minutes depending on the condition of the catalysts and the term is used in a relative and not absolute sense.)

The invention has been described with reference to a preferred and alternative embodiment. Obviously, modifications and alterations will occur to those skilled in the art upon reading and understanding the Detailed Description of the Invention set forth above. It is intended to include all such modifications and alterations insofar as they come within the scope of the present invention as claimed herein.

The invention claimed is:

1. A system for treating exhaust gases emitted from a vehicle comprising:
   a) a multi-cylinder diesel engine having a first exhaust manifold in fluid communication with a first plurality of cylinders and a second exhaust manifold in fluid communication with a different second plurality of cylinders;
   b) a first NOx adsorber catalyst in a first exhaust leg in fluid communication with said first manifold;
   c) a second NOx adsorber catalyst in a second exhaust leg in fluid communication with said second manifold;
   d) a common exhaust leg having an inlet in fluid communication with said first and second exhaust legs downstream of said first and second NOx catalysts, said common exhaust leg having an oxidation catalyst therein through which exhaust gases from said first and second legs pass after being combined in said common exhaust leg; and,
   e) ECU means controlling the composition of exhaust gases in said first exhaust manifold independently of the composition of exhaust gases in said second exhaust manifold in accordance with a programmed routine, to periodically produce rich gases in one exhaust manifold and lean gases in the other exhaust gas manifold and controlling the quantities of combustible gases present in said rich gas and the quantities of oxygen present in said lean gas to produce a combined gas stream in said common exhaust leg upstream of said oxidation catalyst to have a lambda of at least 1.0, and further including NOx sensors upstream and downstream of each NOx adsorber catalyst and lambda sensors upstream and downstream of each NOx adsorber catalyst, said ECU means sensing said NOx sensors to determine the start of said routine and sensing said lambda sensors to determine the end of said routine wherein said ECU means periodically switches the generation of said rich and lean gases from one exhaust manifold to the other.

2. The system of claim 1 wherein said ECU means periodically switches the gases after an NOx adsorber catalyst receiving said rich gas has been regenerated to a set value.

3. The system of claim 1 further including a catalyzed soot filter upstream of each NOx adsorber catalyst either as a separate catalyst or formed integrally with each NOx adsorber catalyst as an upstream bed thereof.

4. The system of claim 1 wherein said NOx adsorber catalyst includes one or more platinum group metals coated on an alkaline or alkaline earth metal oxide carrier support.

5. The system of claim 1 wherein said oxidation catalyst includes a catalyst material comprising bulk ceria and bulk aluminum with a precious metal.

6. The system of claim 1 wherein said NOx adsorber catalyst is a low temperature lean NOx catalyst including platinum and a zeolite.

7. The system of claim 1 wherein said NOx adsorber catalyst is a high temperature lean NOx catalyst including a base metal and a zeolite.

8. The system of claim 1 wherein each cylinder in said first and second plurality has a fuel injectors, said fuel injector in said first cylinder plurality in fluid communication with a first rail and said fuel injectors in said second cylinder plurality in fluid communication with separate second rail and said ECU means controlling the pressure and flow of fuel oil in said first and second rails independently whereby the A/F ratio in each cylinder plurality is independently controlled to produce desired rich or lean exhaust gases from each plurality of cylinders.

9. The system of claim 1 wherein the combined gas stream in said common exhaust leg upstream of said oxidation catalyst having a lambda not less than about 2.0.

10. The system of claim 9 wherein said rich gas has a lambda less than 1.0 and said lean gas has a lambda greater than 1.0.

11. The system of claim 10 wherein said rich gas has a lambda not greater than about 1.0 and said lean gas has a lambda not less than about 2.0.

12. A process for controlling noxious emissions produced by a vehicle equipped with a multi-cylinder diesel engine having separate first and second exhaust manifolds through which discrete first and second pluralities of cylinders, respectively, exhaust their products of combustion as exhaust gases, said engine having a programmable ECU controlling the composition of said exhaust gases produced by said engine, said method comprising the steps of:

a) providing a first NOx adsorber catalyst downstream of and in fluid communication with said first exhaust manifold through which a first steam of exhaust gases from said first exhaust manifold pass and a second NOx adsorber catalyst downstream of and in fluid communication with said second exhaust manifold through which a second stream of exhaust gases from said second exhaust manifold pass;

b) combining the exhaust gas streams downstream of said first and second NOx adsorber catalysts into a common exhaust stream to produce a substantially mixed common stream of exhaust gases from said first and second exhaust streams;

c) providing NOx sensors upstream and downstream of each NOx adsorber catalyst and lambda sensors upstream and downstream of each NOx adsorber catalyst:

d) passing said combined stream of exhaust gases through an oxidation catalyst;

e) controlling by said ECU with a programmed routine the composition of said exhaust gases in said first exhaust stream independently of the composition of said exhaust gases in said second stream to periodically produce a rich exhaust stream passing through one of said NOx adsorber catalysts and a lean exhaust stream passing through the other adsorber catalyst, and controlling the quantities of combustible gases present in said rich gas and the quantities of oxygen present in said lean gas to produce a combined gas stream in said common exhaust leg upstream of said oxidation catalyst having a lambda of at least 1.0, whereby the NOx catalyst exposed to said rich exhaust stream is regenerated; and, f) sensing with said ECU said NOx sensors to determine the start of said routine and sensing said lambda sensors to determine the end of said routine wherein said ECU periodically switches the generation of said rich and lean gases from one exhaust manifold to the other.

13. The process of claim 12 wherein sufficient oxygen exists in said combined stream to permit oxidation of HC and CO in said oxidation catalyst.

14. The process of claim 12 wherein lambda of said rich exhaust stream is 1.0 or less and lambda of said lean exhaust stream is 1.0 or greater.

15. The process of claim 14 wherein lambda of said rich exhaust stream is less than 1.0 and lambda of said lean exhaust stream is at least 2.0 or greater.

16. The process of claim 12 further including the step of providing a catalyzed soot filter upstream of each NOx adsorber catalyst or integrated into said NOx adsorber catalyst and periodically changing the composition of the lean exhaust stream to cause the presence of combustibles in the lean exhaust stream sufficient to heat the exhaust gas passing through said catalyzed filter to higher temperatures and thereafter further changing the composition of said lean exhaust gas compositions to generate a pulse of set time duration causing a rich exhaust gas to pass over said NOx adsorber catalyst previously receiving said lean exhaust gas when the bed temperature of said NOx adsorber catalyst is at a temperature sufficient to release sulfur, said sulfur being reduced to $H_2S$ and subsequently oxidized in said oxidation catalyst.

17. The process of claim 16 wherein the temperature range at which said NOx adsorber catalyst is catalytically active to store and release NOx is about 150° C. to about 550° C. and the temperature range at which said NOx catalyst is catalytically active to release sulfur trapped therein is about 550EC or greater and lambda is less than 1.

18. The process of claim 12 further including the step of causing the composition of said first and second exhaust gases to reverse when one of said NOx adsorber catalysts has been regenerated.

19. The process of claim 18 wherein the lambda values of said first and second exhaust streams are set at values sufficient to assure that a net oxygen content of said combined gas stream is at least 2.0% or greater.

20. The process of claim 19 wherein the net oxygen content of said combined exhaust stream is at least 5.0% or greater.

21. The process of claim 20 wherein the next oxygen content of said combined exhaust stream is at least 8.0% or greater.

22. The process of claim 12 wherein said rich exhaust stream flowing through one of said NOx adsorber catalysts is caused to occur when said one NOx adsorber catalyst has at least 50% or more of its NOx storage sites occupied but saturation of the NOx storage site has not occurred.

23. The process of claim 22 further including the step of ascertaining that the NOx adsorber catalyst bed temperature is within the NOx catalytically active temperature range of the NOx adsorber catalyst before causing said rich exhaust gas composition to be produced.

24. The process of claim 23 further including the step of changing the rich exhaust gas composition to a lean exhaust gas composition when the engine is at a set load.

25. The process of claim 24 further including the step of changing the rich gas composition to a lean gas composition when the NOx adsorber catalyst has been purged of a trapped NOx so that 50% or more of the NOx actuation sites are available for adsorbing NOx.

26. In a process for controlling NOx emissions generated by a vehicular light duty diesel engine using a NOx adsorber catalyst, the improvement comprising the steps of:
  a) providing a first exhaust manifold in fluid communication only with a first bank of engine cylinders and a first NOx catalyst in fluid communication with said first exhaust manifold;
  b) providing a second exhaust manifold in fluid communication only with a second bank of different cylinders and a second NOx adsorber catalyst in fluid communication with said second exhaust manifold;
  c) providing NOx sensors upstream and downstream of each NOx adsorber catalyst and lambda sensors upstream and downstream of each NOx adsorber catalyst;
  d) sequentially regenerating said NOx adsorber catalysts by first causing said first bank of cylinders to generate a rich exhaust gas stream which passes through said first NOx adsorber catalyst while said second bank of cylinders generate a lean exhaust gas stream which passes through said second NOx adsorber catalyst until said first NOx adsorber catalyst is regenerated and then causing said second bank of cylinders to generate a rich exhaust gas passing through said second NOx adsorber catalyst while said first bank of cylinders generate a lean exhaust gas passing through said first NOx adsorber catalyst;
  e) combining the exhaust gas streams downstream of said first and second NOx adsorber catalysts into a common exhaust stream to produce a substantially mixed common stream of exhaust gases from said first and second exhaust streams;
  f) controlling with an ECU programmed routine the quantities of combustible gases present in said rich gas and the quantities of oxygen present in said lean gas to produce a combined gas stream having a lambda of at least 1.0; and,
  g) sensing with said ECU said NOx sensors to determine the start of said routine and sensing said lambda sensors to determine the end of said routine wherein said ECU periodically switches the generation of said rich and lean gases from one exhaust manifold to the other.

27. The improved process of claim 26 wherein said rich and lean exhaust gas streams in said exhaust manifolds are produced by independently varying the A/F ratio in each cylinder bank to produce said exhaust gas compositions, said process further including the step of providing separate first and second hydraulic rails in fluid communication with fuel injectors in said first and second cylinder banks, respectively, and independently controlling the pressure and flow of fuel oil in each rail to assure a desired A/F ratio in each bank of cylinders.

28. The improved process of claim 26 further including the steps of combining passing said combined gas stream through an oxidation catalyst to minimize emission slip.

29. The improved process of claim 28 further including the step of providing a catalyzed soot filter upstream of and adjacent to each NOx adsorber catalyst and when the temperature of said NOx adsorber catalyst through which a lean exhaust gas is flowing reaches a set temperature, momentarily changing the lean exhaust gas composition to a rich exhaust gas composition for releasing sulfur trapped in said NOx adsorber catalyst.

30. The improved process of claim 28 further including the step of setting the richness of said rich exhaust gases and the leanness of said lean exhaust gases to lambda values which produce said combined exhaust gas stream having a next oxygen content of 2.0% or more.

31. The improved process of claim 30 wherein the net oxygen content of said combined exhaust stream must be at least 5.0% or more.

32. The improved process of claim 31 wherein the net oxygen content of said combined exhaust stream must be at least 8.0% or more.

* * * * *